United States Patent
Block et al.

(10) Patent No.: US 10,849,266 B2
(45) Date of Patent: Dec. 1, 2020

(54) APPARATUS FOR DISTRIBUTING A MIXED FLUID AND APPARATUS FOR DISTRIBUTING BULK MATERIAL

(71) Applicants: Hugo Vogelsang Maschinenbau GmbH, Essen (DE); Prometheus GmbH & Co. KG, Löningen-Bunnen (DE)

(72) Inventors: Karl-Heinz Block, Löningen (DE); Paul Krampe, Essen/ Olbg. (DE); Martin Hertwig, Essen (DE)

(73) Assignees: Hugo Vogelsang Maschinenbau GmbH, Essen (DE); Prometheus GmbH & Co. KG, Löningen-Bunxnen (DE)

(*) Notice: Subject to any disclaimer, the term of this patent is extended or adjusted under 35 U.S.C. 154(b) by 0 days.

(21) Appl. No.: 14/914,167

(22) PCT Filed: Aug. 18, 2014

(86) PCT No.: PCT/EP2014/067523
§ 371 (c)(1),
(2) Date: Feb. 24, 2016

(87) PCT Pub. No.: WO2015/028326
PCT Pub. Date: Mar. 5, 2015

(65) Prior Publication Data
US 2016/0212933 A1    Jul. 28, 2016

(30) Foreign Application Priority Data
Aug. 26, 2013   (DE) .................. 20 2013 007 590 U

(51) Int. Cl.
*B05B 12/00*  (2018.01)
*A01C 23/00*  (2006.01)
*A01C 7/10*   (2006.01)

(52) U.S. Cl.
CPC ............ *A01C 23/003* (2013.01); *A01C 7/105* (2013.01); *A01C 23/007* (2013.01); *A01C 23/008* (2013.01); *B05B 12/004* (2013.01)

(58) Field of Classification Search
CPC ..... A01C 23/003; A01C 23/008; A01C 7/105; A01C 23/007; B05B 12/004
(Continued)

(56) References Cited

U.S. PATENT DOCUMENTS 4,193,356 A    3/1980   Vehe et al.
4,238,790 A *  12/1980  Balogh .................. A01C 7/105
                                                    340/684

(Continued)

FOREIGN PATENT DOCUMENTS

CN    2669156 Y    1/2005
CN    102944269 A  2/2013

(Continued)

OTHER PUBLICATIONS

German Application No. 202013007590.2, Search Report dated May 15, 2014, 4 pages.

(Continued)

*Primary Examiner* — Qingzhang Zhou
(74) *Attorney, Agent, or Firm* — Kilpatrick Townsend & Stockton LLP; Dean W. Russell; Anthony L. Guebert

(57) ABSTRACT

The invention concerns apparatuses (1) for distributing mixed fluid or bulk material on to agricultural productive surfaces (100) comprising a distribution device (5) which has at least one fluid inlet (3) which can be connected to a mixed fluid supply and a plurality of outlets (7).

Figure 1:
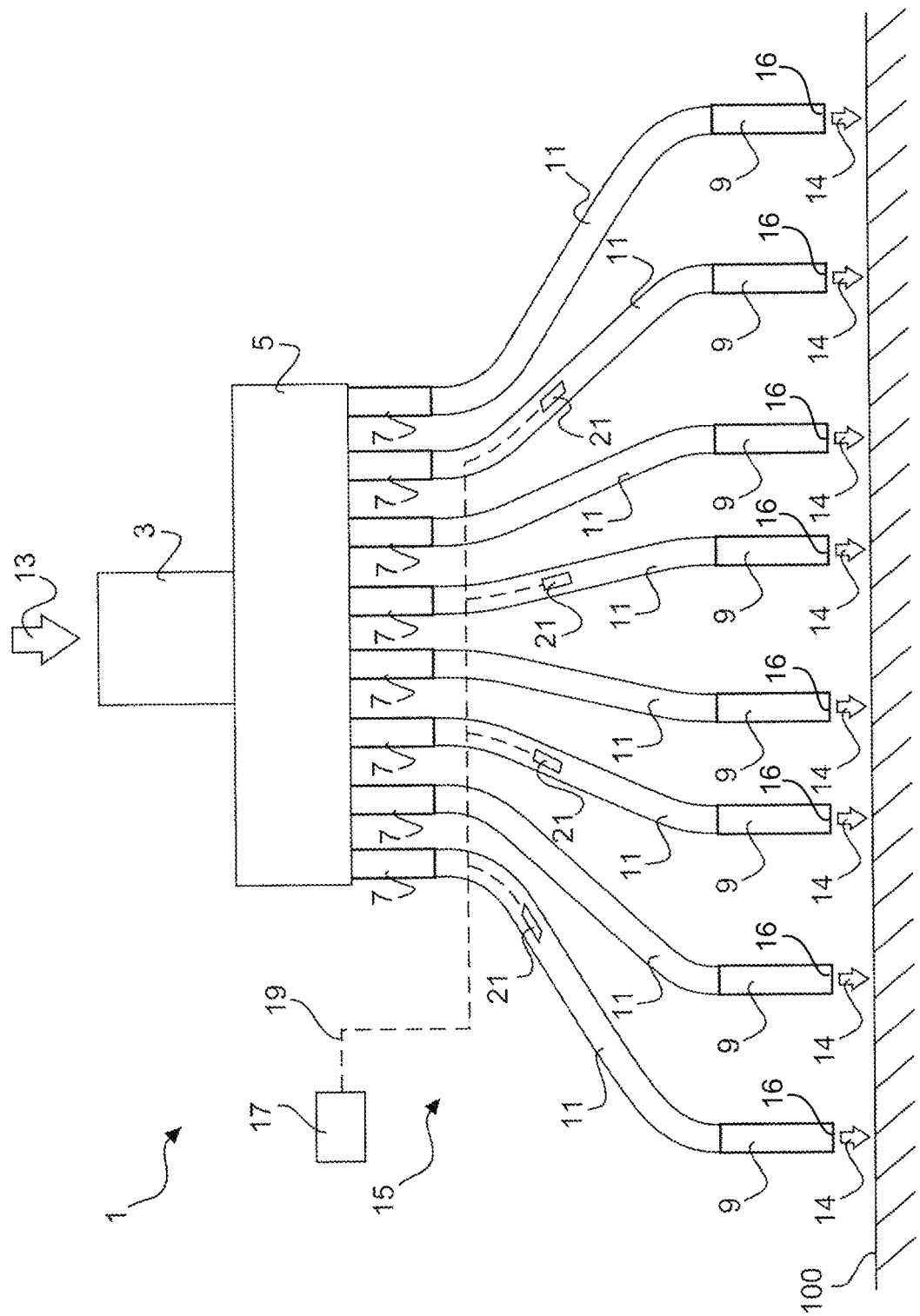

The apparatus has a plurality of conduits (11) connected to the outlets, wherein the conduits (11) have a respective connecting portion (35*b*) for coupling to an application device (9), wherein an outlet (7) and the conduit (11)

(Continued)

connected to the fluid outlet define a respective flow path. In particular the apparatuses have a device (15) for blockage detection in individual ones of, a plurality of or all flow paths, that has a plurality of sensors (21), and an electronic evaluation unit (17) which is adapted to receive the measurement signals output by the sensors (21), compare them to each other and on the basis of signal deviations determined in that case to identify individual ones of or a plurality of flow paths as blocked.

21 Claims, 6 Drawing Sheets

(58) Field of Classification Search
USPC .............................................. 239/71, 72, 74
See application file for complete search history.

(56) References Cited

U.S. PATENT DOCUMENTS

| | | |
|---|---|---|
| 7,450,019 B1 | 11/2008 | Spain |
| 2010/0010667 A1* | 1/2010 | Sauder .................... B60Q 1/26 |
| | | 700/231 |
| 2012/0168530 A1* | 7/2012 | Ellingson .............. B05B 12/008 |
| | | 239/71 |
| 2013/0144827 A1 | 6/2013 | Trevino et al. |

FOREIGN PATENT DOCUMENTS

| | | |
|---|---|---|
| DE | 2901493 | 7/1979 |
| DE | 3143910 | 8/1983 |
| DE | 8817220 U1 | 8/1994 |
| DE | 29715481 U1 | 1/1998 |
| DE | 19723137 | 12/1998 |
| DE | 202005008363 U1 | 11/2006 |
| EP | 0079018 | 5/1983 |
| EP | 0322046 | 6/1989 |
| JP | S51-096479 U | 8/1976 |
| JP | 2000-193529 A | 7/2000 |
| JP | 2001-231321 A | 8/2001 |
| JP | 2011-083246 A | 4/2011 |
| WO | 20120106544 | 8/2012 |

OTHER PUBLICATIONS

International Application No. PCT/EP2014/067523, Search Report (and English translation) dated Nov. 13, 2014, 8 pages.
International Application No. PCT/EP2014/067523, Written Opinion dated Nov. 13, 2014, 7 pages.
Chinese Application No. 201480057132.6, Office Action (including Search Report and translation) dated Jun. 23, 2017, 22 pages (with translation).
Canada Patent Application No. 2922277, Examination Report dated May 3, 2018, 6 pages.
Japan Patent Application No. 2016-537217, Office Action dated Oct. 31, 2017, with translation.
China Patent Application No. 201480057132.6, Office Action dated Dec. 14, 2018.

* cited by examiner

APPARATUS FOR DISTRIBUTING A MIXED FLUID AND APPARATUS FOR DISTRIBUTING BULK MATERIAL

CROSS REFERENCE TO RELATED APPLICATIONS

This application is the U.S. national phase entry of International Patent Application No. PCT/EP2014/067523 ("the '523 application"), filed on Aug. 18, 2014, which application is related to and claims priority benefits from German Patent Application No. 202013007590.2 ("the '902 application"), filed on Aug. 26, 2013. The '523 and '902 applications are hereby incorporated in their entireties by this reference.

The present invention concerns an apparatus for distributing a mixed fluid, in particular liquid manure or slurry manure, on agricultural productive surfaces. The invention also concerns an apparatus for distributing bulk material, in particular seed or mineral fertiliser on such agricultural productive surfaces.

Apparatuses of the above-indicated kind have a distribution device which has at least one inlet which can be connected to a supply and a plurality of outlets, as well as a plurality of conduits connected to the outlets for distribution of the mixed fluid or bulk material to a predetermined working width, wherein the conduits at their downstream end each have a connecting portion for coupling to an application device, wherein the application device is adapted in particular for delivering the mixed fluid or bulk material in the direction of the productive surfaces, and wherein an outlet and the conduit connected to the outlet define a respective flow path. In part two or three liquid manure hoses are also brought together at a cultivator tine (application device) so that in such cases the flow path is defined by the plurality of conduits.

Such apparatuses are known and wide-spread in particular in the field of mixed fluid application, but in that respect substantially the same delivery procedure is also used for applying seed or mineral fertiliser.

Apparatuses for distributing liquid manure or sewage sludge are known for example from DE 31 43 910 or DE 29 71 5481.

In the known distribution apparatuses the conveyor conduits between the distribution device and the application device are mostly in the form of hose lines which coming from the distributor are deflected one or more times until they have reached the connection to the application device.

The application device used is in the form of discharge nozzles, spray nozzles or also injection devices with which the mixed fluid or bulk material is selectively discharged in the direction of the surface or can be incorporated in specifically targeted fashion into the depth of the productive surface. The latter is also known in the form of the strip-till process known from the present applicant. However application in a condition of free discharge from the hoses, the so-called trailing hose mode of operation, is also wide-spread.

In the known distribution apparatuses and application systems, partial or complete blockages in the flow path can occur because of the fluid composition and the long conduit lengths. In the case of apparatuses whose application devices engage into the ground, such blockages can also occur in the region of the application devices for example in situations involving travel in reverse or because of certain ground compositions. If such blockages are not detected the result of this is that entire rows of an agricultural productive surface, that are travelled along by the distribution apparatuses on vehicles provided in front of same are not supplied with mixed fluid or bulk material. That results in yield losses in the agricultural procedure, which should definitely be avoided. An undetected blockage can also lead to over-fertilisation of other areas.

In consideration of the distribution apparatuses which are becoming larger and larger in the industry, with more and more outlets of in part over a hundred flow paths with corresponding conduits and application devices and an increase in the proportion of apparatuses which inject directly into the around, it is becoming increasingly difficult for a user to detect blockages in individual flow paths so that the risk of losses of yield increases.

The object of the invention was therefore that, in distribution apparatuses of the kind set forth in the opening part of this specification, of providing an improvement which minimises the risk of yield losses in operation.

In apparatuses of the kind set forth in the opening part of this specification, in a first aspect, the object of the invention is attained by means of a device for blockage detection in individual ones, a plurality of or all flow paths, which has a plurality of sensors which are respectively introduced into one of the flow paths and are adapted to output a measurement signal dependent on the delivery flow in the flow path, and an electronic evaluation unit which is adapted to receive the measurement signals output by the sensors, compare them to each other and on the basis of signal deviations determined in that case to identify individual ones of or a plurality of flow paths as blocked. In that respect the invention makes use of the realisation that the most reliable way of detecting a blockage in the flow path can be effected immediately where the blockage itself occurs. According to the invention that is achieved in that the sensors are introduced directly into the flow paths in order to monitor the delivery flow there. A particular advantage of the invention is that the measurement signals output by the sensors are compared to each other and the evaluation unit can reliably recognise blockage of individual conduits by virtue of individual measurement signals standing out from the mass of the compared measurement signals by virtue of a signal deviation. That procedure is so reliable for the reason that preliminary calibration of the sensors is unnecessary. When applying both mixed fluid like for example liquid manure and also when applying bulk material, which considered technically has to be viewed as a mixture of air or gas and bulk material, fluctuations in the delivery flow occur by virtue of constantly changing operating conditions. Those fluctuations can be on the one hand the volume flow delivered overall by the distribution device to all conduits and on the other hand the temperature and composition of the material being conveyed or the pressure of that material.

Those fluctuations also have an influence on the measurement signals detected by the sensors. When using a technology requiring calibration, those fluctuations would have to be incorporated into that calibration operation, which appears technically complicated and laborious. As according to the invention however the signals delivered by all sensors are compared together, those signals in their entirety provide a more or less sharp "normal range". As soon as individual flow paths are partially or completely blocked however the measurement signals acquired from the sensors which are respectively placed there will markedly differ in comparison with the other measurement signals of the surrounding flow paths. That is detected by the evaluation unit inspite of the other fluctuations affecting all flow paths. The blockage detection according to the invention is particularly robust for that reason.

Preferably the sensors each have a conductor which can be acted upon with a voltage and which has current flowing therethrough and which is connected to the flow path in heat-conducting relationship.

In that case the current-carrying conductor has a volume resistance which changes in dependence on temperature and in particular increases with rising temperature. Preferably the resistance is in the form of a PTC resistance element which otherwise is also used for current limitation in respect of electronic assemblies, in particular for short-circuiting safeguard purposes. The resistance value of the resistance means is about 100 ohms at 20° C. At about 60° C. the resistance value reaches a stable working point, that is to say the resistance is so great that the temperature remains at 60° C. If more energy is dissipated to the delivery material flowing therepast the resistance falls and more electrical energy is fed to the system to maintain the working point at 60° C. That current (about 20 mA at 12 V) is preferably evaluated.

The mode of operation of the sensors of such a configuration is substantially as follows: a blockage in the flow path leads to a disturbance in or a variation in the flow. Thus the quantitative and qualitative nature of the flow is influenced in the entire flow path between the distribution device and the application device. Depending on the severity of the blockage the speed and phase composition of the flow changes. The current-carrying conductor in the flow path is heated by virtue of the applied voltage. Because the current-carrying conductor is also in thermal contact with the medium in the flow path heat transport occurs in the event of a temperature difference between the delivery material (mixed fluid or bulk material) and the conductor itself. The resistance of the current-carrying conductor changes in dependence on the heat transport between the conductor and the fluid. In the event of substantially constant flow conditions in the flow path an equilibrium condition occurs in respect of the current measured in the current-carrying conductor, its resistance and the temperature. If however the heat transfer occurring between the current-carrying conductor and the flow path changes due to a change in the flow speed, phase composition and other symptoms which occur upon a blockage in the flow path then that equilibrium condition changes towards another current strength because the resistance of the current-carrying conductor changes.

Accordingly the measurement signals respectively output by the sensors represent the respective current strength in the current-carrying conductor and the electronic evaluation unit is adapted to form an average value from the received measurement signals, to compare individual ones of the measurement signals to the average value formed, and to produce a blockage signal when a predetermined deviation from the average value formed is reached or exceeded. The necessary deviation for generating such a blockage signal is preferably in a region of 3% and above, preferably 5% and above.

In a preferred embodiment of the invention the blockage detection device has means for sound generation and is adapted to output an acoustic warning signal when the blockage signal is present.

In a further preferred embodiment the blockage detection device has display means, in particular an illumination panel with lighting means for each flow path provided with sensors and/or a display device and is adapted to visually display the flow path in question when the blockage signal is present.

Alternatively or additionally the blockage detection device is preferably provided with means for remote data transmission and is adapted to transmit the received measurement signals and/or the blockage signals to a remote maintenance and/or remote control location. In that way it becomes possible for the occurrence of malfunctions to be accurately protocolled even in partly automated or completely automated operation of the distribution apparatus according to the invention in order subsequently to be able to provide re-treatment at the protocolled and ideally mapped faulty locations by means of subsequently applying mixed fluid or bulk material. Alternatively the application operation can be stopped in order manually to remove the blockage before operation is continued.

In a particularly preferred configuration of the invention the sensors each have a heat-conductive sensor element arranged in a thermally conductive measurement cap. Preferably the measurement cap is adapted to mechanically isolate the sensor element from the flow path.

The material of the measurement cap and/or the sensor element is preferably selected in such a way that its heat transition coefficient of heat transmission with the medium is as high as possible. For that purpose the material of the measurement cap must have a level of thermal conductivity which is as high as possible. Further requirements are mechanical (abrasion) and chemical (corrosion) resistance in relation to the delivery material being used, and in addition good workability and reasonable costs. In that respect for example brass has proven to be advantageous as it meets those in part conflicting demands.

In this respect the term mechanical isolation is used to mean in particular that the sensor element is protected from mechanical damage by virtue of particles in the delivery material.

Preferably heat-conducting paste is arranged between the measurement cap and the sensor element for making the heat-conducting connection between the sensor element and the flow path. In a preferred alternative configuration provided in the measurement cap is a measurement window in which the sensor element is arranged so that the sensor element can make direct contact with the delivery material. In that case the measurement cap does not completely mechanically isolate the sensor element from the flow path, but it at least constitutes a mechanical support body which stabilises the sensor element.

Preferably a connecting cable is provided for signal output from the sensor element to the electronic evaluation unit and is connected to the sensor element.

In addition preferably the connecting cable is encased by a holding tube and is strain-relieved thereby. The possibility is not to be excluded that a tensile strain is applied to the sensor in operation at the sensor element in the flow path. Strain relief prevents damage to the sensor element or in the worst-case scenario prevents an interruption in the circuit formed by the conductor through which the current flows.

Preferably the holding tube of the sensor has a reduced level of thermal conductivity in comparison with the sensor element and connecting cable. Particularly preferably the thermal conductivity is in the region of 0.5 W/Km or less, preferably 0.3 W/Km or less. A holding tube by way of example in the form of a compressed air tube of polyurethane of an outside diameter of 4 mm and a wall thickness of 0.75 mm has a thermal conductivity of about 0.25 W/Km.

The reduced thermal conductivity of the holding tube has in particular the advantage that influences of the environment on the sensor element are alleviated therewith. The holding tube which completely encloses the connecting cable represents the interface between the sensor and the environment because the holding tube must be passed out of the flow path at some location. The better the holding tube prevents transmission of heat, the correspondingly less are the environmental influences from outside the flow path on the sensor.

In a preferred development of the invention the sensor is directed from the location of its entry into the flow path in a downstream direction and preferably extends downstream into the flow path over a length in the range of 10 to 50 cm, particularly preferably in the range of 20 to 30 cm. An advantage of orienting the sensor in that way is that the flow field within the flow path is influenced as little as possible. A spacing between the sensor and its actual point of entry is also advantageous for the reason that a flow recirculation can occur for example in the region of the fluid or bulk material outlets in the region of the distribution device in a blockage situation, and that flow recirculation consequently initially imparts a "normal" flow to the sensor although a blockage has already occurred further downstream. Spacing the sensor tip which for example can be formed by the measurement cap from the actual point of entry therefore makes it possible to shift the region of the sensor, that is active in terms of measurement, to the location where a blockage is actually expected irrespective of possible flow recirculation. In other words, the measurement location can be placed at a location at which the changes in flow in the event of a blockage are pronounced and can be well measured.

When using a blockage measuring device according to the invention on distribution apparatuses for applying bulk material like for example seed or mineral fertiliser, it is preferred that the sensor is introduced into the flow path to such an extent that measurement can be effected in the immediate proximity of the application discharge device. The background here is that, when using such a material, a blockade backs up only over a short distance. Within that back-up blockage section, a blockage would be better detected by means of the apparatus according to the invention because further downstream the mixture of air and bulk material is only deflected at the end of the back-up blockage section and the thermal interaction with the sensor changes less greatly there.

In terms of introducing the sensor into the flow path care is to be taken to ensure that negative influences of the flow pattern in the flow path are prevented as much as possible. In that respect edges should be avoided, which project in opposite relationship to the flow direction, also in order as far as possible to avoid foreign bodies and fibre materials becoming caught up. Accordingly, preferably provided along a respective flow path is a hose connecting piece having a connecting portion, on to which the fluid conduit is pushed, wherein the sensor is passed with a portion of the holding tube through between the fluid or bulk material conduit and the hose connecting piece and wherein the fluid or bulk material conduit fluid-tightly encloses the hose connecting piece and the holding tube.

Preferably the respective hose connecting piece is arranged at one of the fluid or bulk material outlets of the distribution device or at one of the connecting portions for coupling to the application device or at a location along the fluid conduit.

In regard to application devices and distribution devices which are equipped for example with the CFC technology from Hugo Vogelsang GmbH (CFF=ComfortFlowControl) such hose connecting pieces are in any case present so that those systems can also be retro-fitted at a particularly low level of complication and expenditure in order to achieve blockage detection according to the invention.

Alternatively the sensor can also be introduced into the distribution apparatus by arranging along a respective flow path a bore which is adapted to the holding tube and through which the sensor is passed with a portion of the holding tube, wherein the bore and the holding tube preferably bear against each other in fluid-tight relationship.

The above-mentioned preferred embodiments equally apply to apparatuses for distributing mixed fluid like for example liquid manure but also for apparatuses for distributing bulk material like for example seed or mineral fertiliser. If hereinafter reference is made in each case only to one of those two situations of use that is also to be interpreted as meaning that the corresponding statements also apply to the other situation of use.

In a preferred configuration the electronic evaluation unit is adapted to receive the measurement signals output by the sensors, compare them to each other and on the basis of signal deviations determined in that case to identify deviations in the distribution accuracy. Alternatively or additionally to blockage detection the apparatus according to the invention is capable of qualitatively detecting whether and how greatly the delivery amount in individual flow paths deviates from the delivery amount in other flow paths. For that purpose the invention makes use of the same realisation as was set forth in the opening part of this specification in relation to blockage detection. The deviations from each other can be established by means of signal comparison without for that purpose having to calibrate each sensor for each medium and each and any operating parameter, which would be required for absolute measurement. As soon as a predetermined variation coefficient is no longer observed the evaluation unit is preferably adapted to indicate the deviating flow paths so that for example it is possible to implement a conversion of the mode of operation of the connected distributor.

In accordance with a second aspect the invention is concerned with an improved placement of the sensor in the fluid conduit or bulk material conduit of the apparatus according to the invention. In accordance with this second aspect the object of the invention is in particular additionally that of making it easier for the user to introduce a sensor into the flow path of the respective conduit.

In accordance with this aspect the object of the invention is attained in that a clip is mounted around at least one and preferably a plurality of or all of the conduits, wherein the clip has a projection extending through a corresponding opening in the conduit into the flow path. The clip preferably has a quick-action closure means, for example a snap-action closure means, for opening and closing the clip with one hand.

Alternatively or additionally the clip preferably has a first connecting portion having an external tooth arrangement and a second connecting portion having an internal tooth arrangement corresponding thereto. The portion having the internal tooth arrangement is preferably designed to receive the corresponding portion having the external tooth arrangement in it and to hold the tooth arrangements in a latching position.

According to a first preferred development the clip is in the form of an insertion clip for a sensor with holding tube according to one of the above-described preferred embodiments of the apparatus in accordance with the first aspect.

For that purpose it is preferably provided that the clip has an insertion portion for receiving the sensor and a passage means extending as far as the projection for the sensor, in particular continuously. In addition the clip according to this embodiment preferably has clamping means for arresting the holding tube in the passage means.

A clip of this kind which is in the form of an insertion clip is suitable in particular for use in fluid conduits for the application of liquid manure and the like. It has been found that the measurement caps of the sensors with holding tube for that purpose of use provide the best measurement value resolution when they are arranged at a given spacing relative to the clip.

In accordance with an alternative preferred configuration of the invention according to the second aspect the projection of the clip is in the form of a thermally conductive measurement cap and preferably portion-wise or completely comprises a metal, in particular a hard metal. In this embodiment the clip with its projection serves directly as the sensor. More precisely the projection is in the form of a sensor head.

In this embodiment the clip preferably has a receiving means for the current-carrying conductor and the heat-conductive sensor element, which were described in greater detail hereinbefore with reference to the preferred embodiments of the first aspect. The heat-conductive sensor element is further preferably connected to the measurement cap in thermally conducting relationship.

It has been found that the above-described embodiment is particularly well suited to the area of use of applying bulk material, for example seed or mineral fertiliser. In that case the sensor which in particular is in the form of a hard metal tip enjoys the increased resistance to abrasion. Furthermore with that design configuration there is no need for the measurement cap to be introduced particularly far into the flow path or in spaced relationship in the flow direction with the location of insertion. The measurement value deviations in operation are significantly greater, than would be the case when applying mixed fluid, and for that reason a lower degree of measurement value resolution is adequate, in comparison with the field of use of the clip for applying mixed fluid, for blockage detection purposes.

The configuration of the snap-action closure and the latching means is preferably the same in both kinds of configuration.

Figure 2:
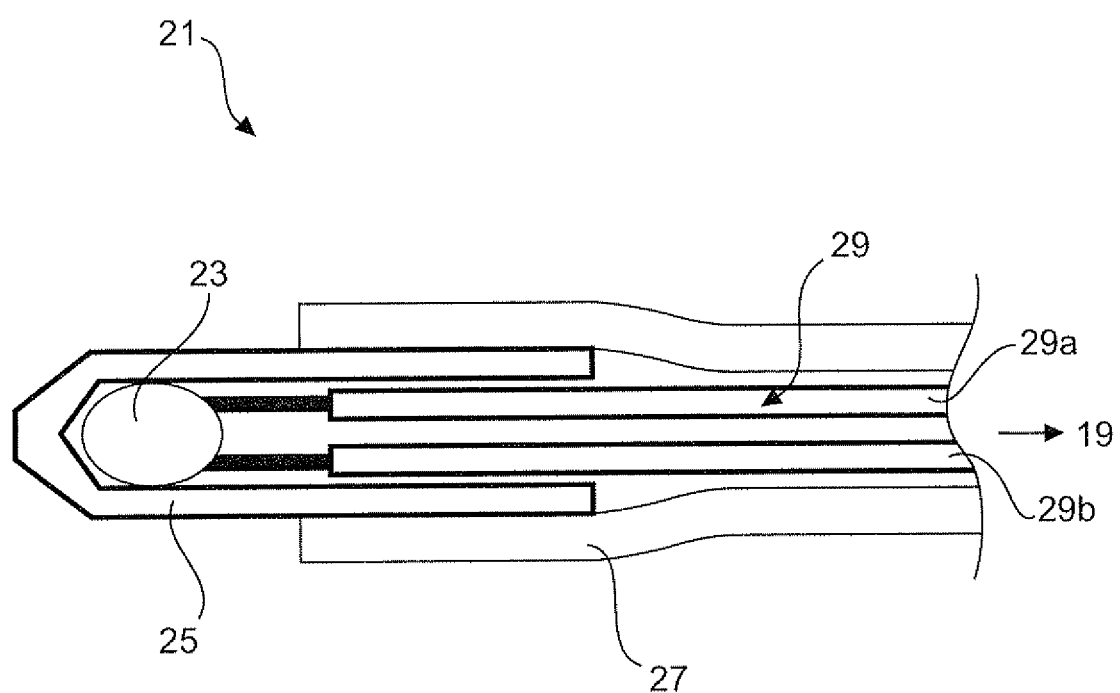
Figure 3A:
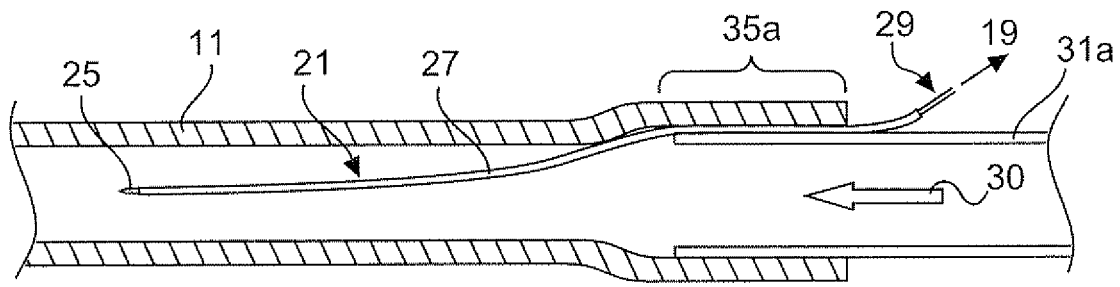
Figure 3B:
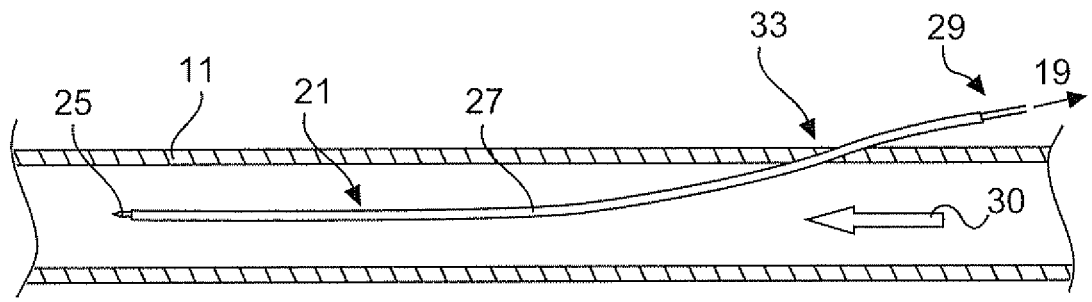
Figure 3C:
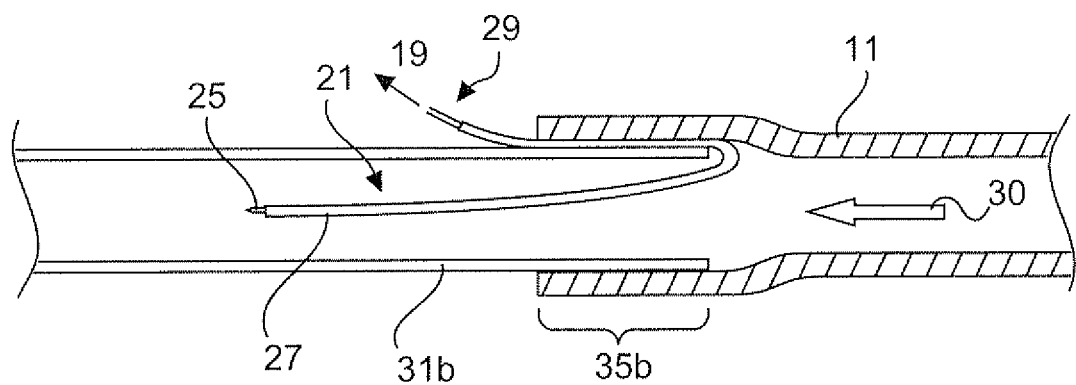
Figure 4A:
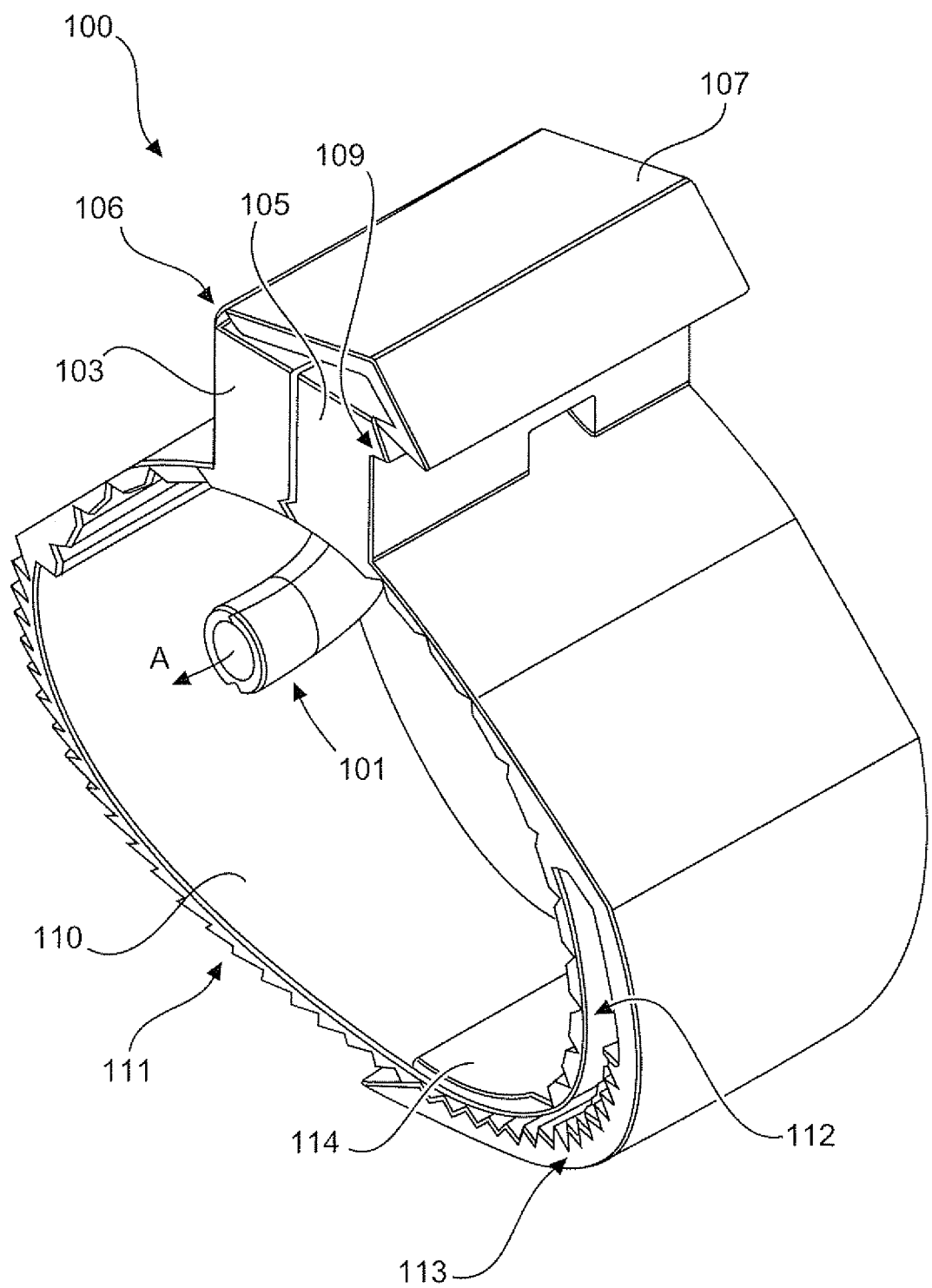
Figure 5:
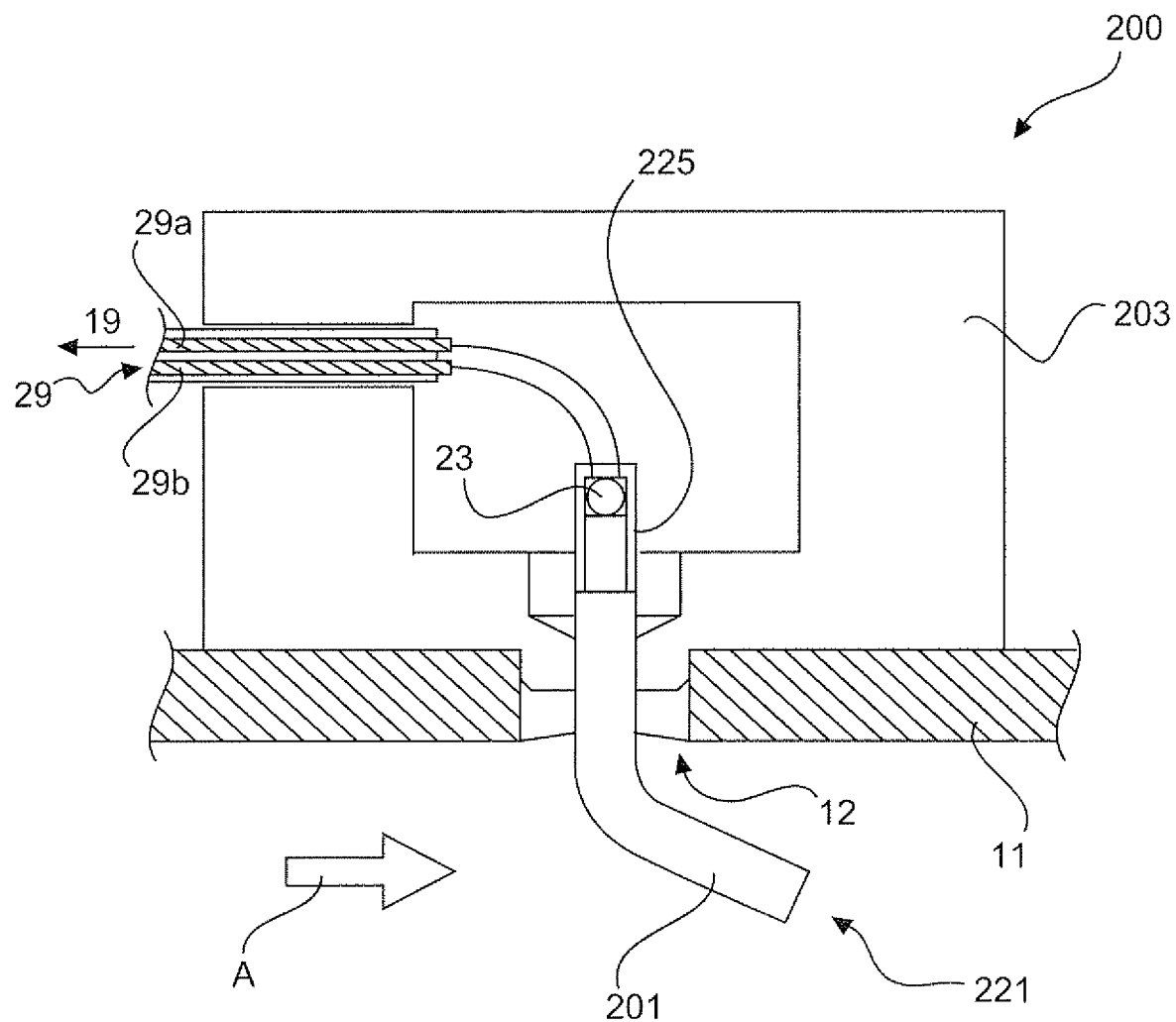

The invention is described in greater detail hereinafter with reference to the accompanying Figures by means of preferred embodiments by way of example. In the Figures:

FIG. 1 shows a distribution apparatus according to the invention in accordance with the first aspect with application devices connected thereto, FIG. 2 shows a detail view of a sensor of the blockage detection device, FIGS. 3a-c show various installation scenarios of the sensor of FIG. 2 in the distribution apparatus according to the preferred embodiment, FIGS. 4a,b show diagrammatic perspective views of a clip according to a first configuration of the second aspect, and FIG. 5 shows a diagrammatic view of a clip according to a second configuration of the second aspect.

The structural configuration of the apparatus described in greater detail hereinafter is substantially the same for the situation of use involving delivery of mixed fluid as for the situation of use involving delivery of bulk material. As far as possible general terms which apply to both configurations are used herein.

FIG. 1 shows a diagrammatic view of a distribution apparatus according to the invention in accordance with a preferred embodiment.

The apparatus 1 shown in FIG. 1 has a distribution device 5. The distribution device 5 has a (mixed fluid or bulk material) inlet 3 for connection to a delivery material supply (for mixed fluids or bulk materials). The distribution device 5 can be a distribution device of known kind and includes means for metering and uniformly distributing the supplied delivery material to a plurality of (mixed fluid or bulk material) outlets 7.

A plurality of application devices 9 is connected to the apparatus 1. The application devices 9 are connected to the respective outlets 7 by means of a respective (mixed fluid or bulk material) conduit 11. A plurality of flow paths are defined from the distribution device 5 to the application devices 9 by the outlets 7 and conduits 11.

The application devices 9 are adapted to discharge the delivered material (mixed fluid or bulk material) through discharge openings 16 in the direction of the arrows 14 on to an agricultural productive surface 10 in generally known manner. That means that corresponding delivery material is previously fed to the apparatus 1 in the direction of the arrow 13.

The apparatus 1 in FIG. 1 further has a blockage detection device 15. The blockage detection device 15 includes an electronic evaluation unit 17 and a plurality of sensors 21. The sensors 21 are connected in communicating relationship with the electronic evaluation unit 17 by means of lines 19. Depending on whether the sensors 21 do or do not have a dedicated signal transducer the lines 19 can be in the form of current or data lines. The sensors 21 are respectively introduced into a flow path and are adapted to output a measurement signal dependent on the delivery flow in the flow path. The electronic evaluation unit 17 is adapted to receive the measurement signals output by the sensors 21, compare them to each other and, on the basis of signal deviations established in that case, to identify individual ones or a plurality of flow paths as being blocked.

In the embodiment shown in FIG. 1 not all flow paths are provided with sensors 21, but only some thereof. Depending on the respective amount of flow paths provided on the apparatus 1 it may be appropriate either to provide all flow paths with sensors or to bundle a respective plurality of flow paths and within that bundle to provide only one flow path with a sensor to save on costs. That can make sense in particular in situations of use where experience has shown that it is not merely one application device or only one flow path that becomes blocked, but experience has shown that a plurality of mutually juxtaposed flow paths always at least partially become blocked at the same time.

It will be noted however that the best possible information density is achieved if each flow path has at least one sensor.

FIG. 2 shows a detail of a sensor 21 shown in FIG. 1. The sensor 21 has a sensor element 23 which is adapted for heat exchange with the delivery material (mixed fluid or bulk material) surrounding the sensor 21. The sensor element 23 is housed by a measurement cap 25 which is intended to protect the sensor element 23 from adverse mechanical effects. The measurement cap 25 is also sufficiently heat-conductive and optionally has a measurement window for the sensor element for simplified contacting with the delivery material in the flow path.

The sensor 21 has a conductor 29 through which current flows and which is preferably formed by two wires 29a, b of a connecting cable. The connecting cable 29a, b is connected to the line 19 for signal output to the electronic evaluation unit (FIG. 1).

A part of the measurement cap 25 and the connecting cable 29a, b is enclosed by a holding tube 27 and is fluid-tightly closed off thereby. Preferably the connecting cable 29a, b is arranged in strain-relieved fashion within the holding tube 27. The holding tube 27 is also preferably adapted to isolate the sensor 21 thermally from its environment outside the flow path.

Various possible ways of fitting the sensor 21 into the flow path are shown in FIGS. 3a to c.

FIG. 3a shows a first preferred option for fitting the sensor 21 into the flow path. In this case the sensor 21 is introduced into a connecting portion 35a between a hose connecting piece 31a and the (mixed fluid or bulk material) conduit 11 and into the flow portion. The connecting piece 31a in this case is preferably arranged at a (mixed fluid or bulk material) outlet of the distribution device.

The sensor 21 extends from the location of insertion thereof downstream in the direction of the arrow 30 along the flow path. The holding tube 27 thermally isolates the sensor 21 from the conduit 11 and the connecting piece 31a. The measurement cap 25 is preferably spaced so far from the connecting portion 35a that a circulatory flow which possibly occurs in the proximity of the connecting piece 31a in the event of a blockage does not reach the measurement cap 25 of the sensor 21.

FIG. 3b shows substantially the same structural elements in regard to the flow path and the sensor 21. As a difference in relation to the FIG. 3a structure however the sensor 21 is not introduced into the flow path at a hose connecting piece but at a location which in principle can be selected as desired along the flow path through a suitable bore 31 (not shown in detail). The holding tube 27 is preferably fluid-tightly disposed in the bore 33.

As in FIG. 3a the connecting cable of the current-carrying conductor 29 is passed out of the flow path and connected (in a manner not shown here) to the line 19 towards the evaluation unit 17 (FIG. 1).

In the configuration shown in FIG. 3c the sensor 21 is passed through between the hose connecting piece 31b and the conduit 11 in a connecting portion 35b of the connecting piece 31b. The connecting piece 31b is preferably arranged at a connecting portion for coupling to an application device. After introduction the sensor 21 is deflected downstream in the direction of the flow path and then extends in that direction. Otherwise the structural configuration is similar to that in FIG. 3a.

Figure 4B:
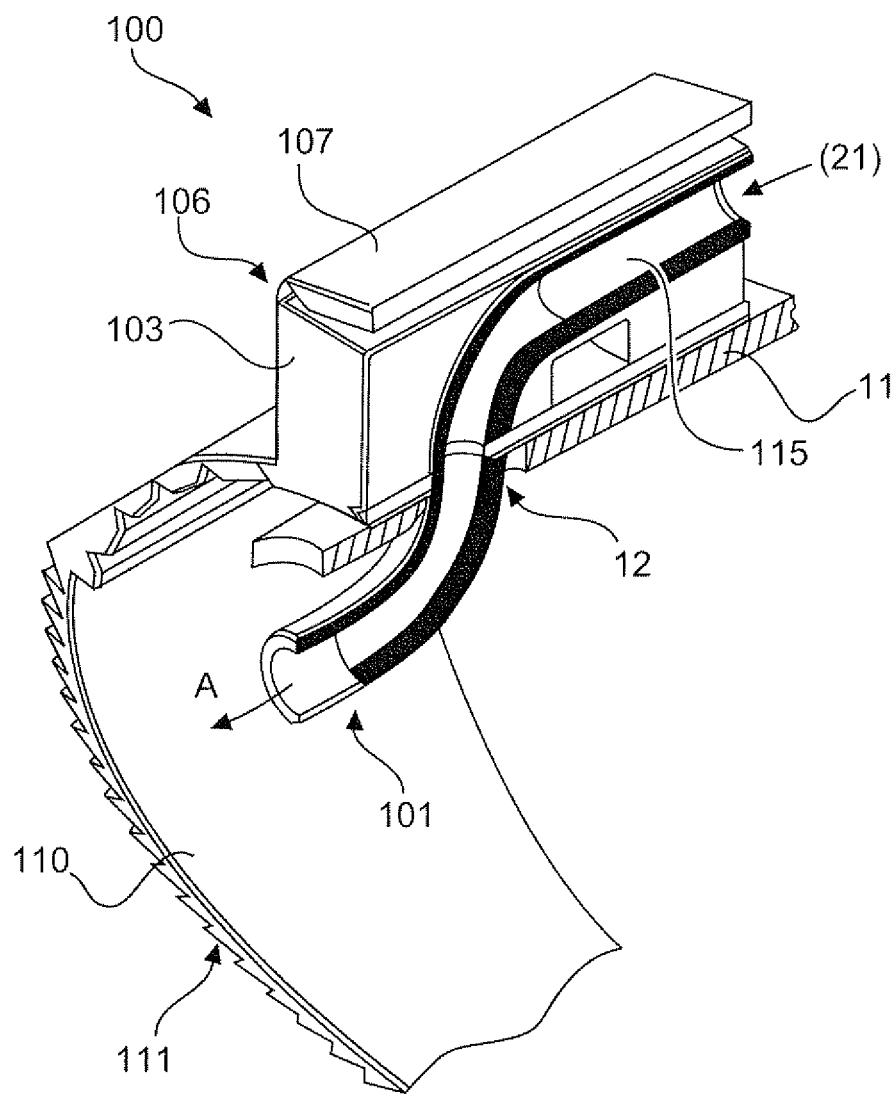

As hereinbefore the invention was described primarily with reference to the first aspect, FIGS. 4a, b and 5 deal with the second aspect of the invention. FIGS. 4a, b show a clip 100 which can be fitted around a conduit 11, for example a mixed fluid conduit or a bulk material conduit. Such a conduit 11 is indicated in FIG. 4b.

Identical references denote the same function as in the case of the sensor 21 shown in FIGS. 1 to 3.

The clip 100 has a main body having a first main body half 103 and a second main body half 105. The clip 100 also has a projection 101.

The projection 101 is formed substantially in respect of each half thereof on a respective one of the two main body halves 103, 105 and is so-to-speak completed with the two main body halves 103, 105 when they are fitted together. The projection 101 extends downstream in the direction of the arrow A.

The first main body half 103 has a hinge 106 at which a catch 107 is resiliently pivotably arranged. The catch 107 is adapted to engage behind a corresponding projection 109 on the second main body half 105 and in that way to form a quick-action closure means for the clip 100.

The clip 100 further has a latching closure for adaptation of the inside diameter of the clip 100 to the conduit 11 which is to be respectively provided with a sensor. The latching closure has a latching tongue 110 which is formed on the first main body half 103 and which has an external tooth arrangement 111, and a corresponding latching tongue receiving means 112 arranged on the second main body half 105. The latching tongue receiving means 112 has an internal tooth arrangement 113 corresponding to the external tooth arrangement 111 on the latching tongue 110. The latching tongue receiving means 112 also has a support portion 114 which is arranged in opposite relationship to the external tooth arrangement 113 and which, being supported inwardly against the conduit 11, holds the external and internal tooth arrangements 111, 113 in engagement with each other when the clip 100 is fitted around the conduit 11.

The clip 100 is preferably designed for one-handed operation by means of the above-indicated closures and has a through passage 115. The passage 115 extends through the main body 103, 105 completely as far as the end of the projection 101 and is adapted to receive a sensor like for example the sensor 21 in accordance with the first aspect and to ensure that it is passed through into the flow path.

The projection 101 is passed through an opening 12 in the conduit 11 and extends into the flow path. The clip 100 shown in FIGS. 4a, b is particularly suitable for use in the blockage detection of mixed fluid conduits.

FIG. 5 shows a further embodiment of a clip 200 according to the second aspect of the invention. The clip 200 is preferably of a similar structural configuration to the clip 100 in FIGS. 4a, b, as far as the provision of a snap-action closure and latching connection etc is concerned. In that respect attention is directed to the foregoing description relating to FIGS. 4a, b.

The clip 200 has a projection 201. Unlike the clip 100 however the projection 201 is not adapted merely for passing therethrough a separate sensor like for example the sensor 21, but forms the sensor head of a sensor 221. The projection 201 serves as a thermally conductive measurement cap 225 connected to a sensor 23 in thermally conducting relationship, wherein the sensor 23 is preferably of the same structural configuration as in the case of the sensor 21 of the apparatus in accordance with the first aspect.

The sensor 200 has a main body 203 which in FIG. 5 is fitted around a conduit 11, in particular a bulk material conduit. The placement of the sensor 200 is so selected that the projection 201 is passed through a corresponding opening 12 and extends preferably downstream into the flow path. The sensor 221 has a conductor 29 which can be acted upon with a voltage and which has current flowing therethrough, with connecting cables 29a, b for connection to an electronic evaluation unit.

The sensor 221 in the clip 200 is particularly suited for use for blockage detection in bulk material conduits, in particular when the projection 201 is in the form of a hard metal tip.

The invention claimed is:

1. Apparatus for distributing a mixed fluid or a bulk material on agricultural productive surfaces comprising:

a distribution device comprising at least one fluid inlet configured to be connected to a mixed fluid supply and a plurality of fluid outlets;

a plurality of fluid conduits, each fluid conduit of the plurality of fluid conduits connected to one of the plurality of fluid outlets for distribution of the mixed fluid onto a predetermined working width, wherein the plurality of fluid conduits each comprise a downstream end connecting to a corresponding application device of a plurality of application devices, wherein each of the plurality of application devices is in the form of discharge nozzles and wherein each of the plurality of application devices is configured for discharge of the mixed fluid in a direction of the agricultural productive surfaces, wherein each of the plurality of fluid outlets connected to a corresponding fluid conduit of the plurality of fluid conduits defines a flowpath of a plurality of flow paths; and a blockage detection device configured for blockage detection in individual flowpaths or all of the plurality of flow paths, the blockage detection device comprising:

a plurality of sensors, each sensor introduced into a corresponding one of the plurality of flow paths and adapted to output a measurement signal dependent on delivery flow in one of the plurality of flow paths, wherein each sensor of the plurality of sensors is directed from a location of entry into one of the plurality of flow paths in a downstream direction and extends downstream in one of the plurality of flow paths, wherein each sensor of the plurality of sensors comprises a heat-conductive sensor element arranged in a thermally conductive measurement cap;

at least one clip fitted around one of the plurality of fluid conduits, wherein the at least one clip comprises a projection extending into one of the plurality of flow paths through a corresponding opening in one of the plurality of fluid conduits, wherein the at least one clip comprises an insertion portion for receiving one of the plurality of scnsor sensors and a passage extending as far as the projection for one of the plurality of sensors.

2. Apparatus according to claim 1, wherein the plurality of sensors each have a conductor which can be acted upon with a voltage and which has current flowing therethrough and which is connected to a respective flowpath of the plurality of flowpaths in a heat-conducting relationship.

3. Apparatus according to claim 2, wherein the conductor has a volume resistance which changes in dependence on temperature.

4. Apparatus according to claim 2, wherein the measurement signal respectively output by one of the plurality of sensors represent a respective current strength in the conductor.

5. Apparatus according to claim 4, wherein the blockage detection device is adapted to output an acoustic warning signal when a blockage signal is present.

6. Apparatus according to claim 4, wherein the blockage detection device has an illumination panel to visually display a blocked flowpath when the blockage signal is present.

7. Apparatus according to claim 6, wherein the illumination panel comprises lighting for each respective flowpath of the plurality of flow paths provided with the plurality of sensors and/or a display.

8. Apparatus according to claim 4, wherein the blockage detection device is adapted to transmit received measurement signals and/or thc blockage signals to a remote maintenance and/or a remote control location.

9. Apparatus according to claim 1, wherein a connecting cable is connected to a sensor of the plurality of sensors for signal output.

10. Apparatus according to claim 9, wherein the connecting cable is encased by a holding tube.

11. Apparatus according to claim 10, wherein the holding tube has a thermal conductivity which is reduced in comparison with the heat-conductive sensor element and the connecting cable.

12. Apparatus according to claim 1, wherein each of the plurality of sensors extends downstream in a respective flowpath of the plurality of flow paths over a length of 10 to 50 cm.

13. Apparatus according to claim 10, wherein provided along thc a respective flowpath of the plurality of flow paths is a hose connecting piece, on to which at least one of the plurality of fluid conduits is pushed, wherein at least one of the plurality of sensors is passed with a portion of the holding tube through between the at least one of the plurality of fluid conduits and the hose connecting piece and wherein the at least one of the plurality of fluid conduits fluid-tightly encloses the hose connecting piece and the holding tube.

14. Apparatus according to claim 13, wherein the hose connecting piece is arranged at one of the plurality of fluid outlets of the distribution device or at the downstream end of each of the plurality of fluid conduits for coupling to each of the plurality of application devices or ata location along the at least one of the plurality of fluid conduits.

15. Apparatus according to claim 10, wherein arranged along a respective flow path of the plurality of flow paths is a bore which is adapted to the holding tube and through which a respective sensor of the plurality of sensors is passed with a portion of the holding tube, wherein the bore and the holding tube bear against each other in a fluid-tight relationship.

16. Apparatus according to claim 1, wherein at least a portion of the at least one clip comprises metal.

17. Apparatus according to claim 1, wherein the thermally conductive measurement cap is movable within a flow path of the plurality of flow paths.

18. Apparatus according to claim 1, wherein the mixed fluid is liquid manure or slurry manure.

19. Apparatus according to claim 3, wherein the volume resistance increases with rising temperature.

20. Apparatus according to claim 1, wherein a heat-conducting paste is arranged between the thermally conductive measurement cap and each of the plurality of sensors for making a heat-conducting connection between each of the plurality of sensors and each of the plurality of flow paths.

21. Apparatus according to claim 10, wherein the connecting cable is strain -relieved.

* * * * *

UNITED STATES PATENT AND TRADEMARK OFFICE
CERTIFICATE OF CORRECTION

Page 1 of 2

PATENT NO. : 10,849,266 B2
APPLICATION NO. : 14/914167
DATED : December 1, 2020
INVENTOR(S) : Karl-Heinz Block et al.

It is certified that error appears in the above-identified patent and that said Letters Patent is hereby corrected as shown below:

On the Title Page

In item (73), in Column 1, in "Assignees", Line 3, delete "Löningen-Bunxnen" and insert -- Löningen-Bunnen --, therefor.

In the Claims

In Column 11, Line 18, in Claim 1, delete "flowpath" and insert -- flow path --, therefor.

In Column 11, Line 21, in Claim 1, delete "flowpaths" and insert -- flow paths --, therefor.

In Column 11, Line 41, in Claim 1, before "sensors" delete "scnsor".

In Column 11, Line 46, in Claim 2, delete "flowpath" and insert -- flow path --, therefor.

In Column 11, Line 47, in Claim 2, delete "flowpaths" and insert -- flow paths --, therefor.

In Column 11, Line 60, in Claim 6, delete "flowpath" and insert -- flow path --, therefor.

In Column 12, Line 2, in Claim 7, delete "flowpath" and insert -- flow path --, therefor.

In Column 12, Line 7, in Claim 8, after "and/or" delete "thc".

In Column 12, Line 19, in Claim 12, delete "flowpath" and insert -- flow path --, therefor.

In Column 12, Line 22, in Claim 13, after "along" delete "thc".

In Column 12, Line 22, in Claim 13, delete "flowpath" and insert -- flow path --, therefor.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*

In Column 12, Line 35, in Claim 14, delete "ata" and insert -- at a --, therefor.

In Column 12, Line 59, in Claim 21, delete "strain -relieved." and insert -- strain-relieved. --, therefor.